(12) United States Patent
Murray

(10) Patent No.: US 9,469,173 B2
(45) Date of Patent: Oct. 18, 2016

(54) VEHICLE SUSPENSION

(71) Applicant: Ian Gordon Murray, Puttenham (GB)

(72) Inventor: Ian Gordon Murray, Puttenham (GB)

(73) Assignee: Gordon Murray Design Limited, Shalford (GB)

( * ) Notice: Subject to any disclaimer, the term of this patent is extended or adjusted under 35 U.S.C. 154(b) by 0 days.

(21) Appl. No.: 14/199,565

(22) Filed: Mar. 6, 2014

(65) Prior Publication Data

US 2015/0251510 A1    Sep. 10, 2015

(51) Int. Cl.
*B60G 7/00*    (2006.01)
*B60G 3/20*    (2006.01)

(52) U.S. Cl.
CPC .............. *B60G 3/202* (2013.01); *B60G 7/001* (2013.01); *B60G 2200/156* (2013.01); *B60G 2200/182* (2013.01); *B60G 2204/148* (2013.01); *B60G 2206/124* (2013.01)

(58) Field of Classification Search
CPC combination set(s) only.
See application file for complete search history.

(56) References Cited

U.S. PATENT DOCUMENTS

| | | | |
|---|---|---|---|
| 2,556,767 A |   | 6/1951 | McCann |
| 3,189,118 A | * | 6/1965 | Arning ........................ 180/359 |
| 3,926,454 A | * | 12/1975 | Van Winsen ........... 280/124.146 |
| 4,269,432 A | * | 5/1981 | Inoue et al. ........... 280/124.144 |
| 4,273,356 A |   | 6/1981 | Sakata et al. |
| 4,278,270 A |   | 7/1981 | Fry |
| 4,458,915 A | * | 7/1984 | Emery ........................ 280/5.524 |
| 4,474,389 A |   | 10/1984 | Von der Ohe |
| 4,511,160 A | * | 4/1985 | Inoue .................... 280/124.148 |
| 4,515,391 A | * | 5/1985 | Koide ................... 280/124.144 |

(Continued)

FOREIGN PATENT DOCUMENTS

| | | |
|---|---|---|
| EP | 0519825 | 12/1992 |
| JP | S48-033515 | 11/1974 |

(Continued)

OTHER PUBLICATIONS

Decision of Rejection for Japanese Patent Application No. 2011-552500, mailed Oct. 21, 2014.

(Continued)

*Primary Examiner* — Nicole Verley
(74) *Attorney, Agent, or Firm* — Westman, Champlin & Koehler, P.A.; Z. Peter Sawicki

(57) ABSTRACT

A vehicle suspension comprises an assembly of a hub carrier and a support arm, the support arm being attached to the hub carrier at two points spaced from each other in the direction of travel and extending inwardly therefrom to a support arm attachment point for fixing to a chassis, and a trailing link extending from the assembly in a direction transverse to that of the support arm, toward a trailing link attachment point for fixing to the chassis. The trailing link preferably extends from the assembly in a forward direction, and is preferably connected directly to the hub carrier. A strut can extend upwardly toward an attachment point for fixing to a chassis, to provide a spring and damper. The support arm can comprise a pair of arms extending divergently from the attachment point to each of the two points. The hub carrier can include a pivot pin extending in a fore/aft alignment, passing through two pivot points on the support arm thereby to define the two points. The appropriate end of the pivot pin provides a convenient location for attaching the trailing link to the hub carrier. The invention further relates to a vehicle, comprising a chassis and at least two wheels, one on each side of the vehicle, each wheel being attached to the chassis via such a suspension.

9 Claims, 3 Drawing Sheets

(56) References Cited

U.S. PATENT DOCUMENTS

| | | | |
|---|---|---|---|
| 4,534,435 A | | 8/1985 | Shibahata et al. |
| 4,650,211 A | * | 3/1987 | Tanahashi ............... 280/124.144 |
| 4,765,647 A | * | 8/1988 | Kondo et al. .......... 280/124.128 |
| 4,807,901 A | * | 2/1989 | Kondo ....................... 280/5.524 |
| 4,848,788 A | * | 7/1989 | Rumpel ................. 280/124.138 |
| 4,969,661 A | * | 11/1990 | Omura et al. ......... 280/124.143 |
| 5,080,388 A | * | 1/1992 | Berry et al. ............. 280/86.757 |
| 7,048,286 B2 | | 5/2006 | Eppelein |
| 7,338,057 B2 | * | 3/2008 | Kröpfl et al. .......... 280/124.134 |
| 7,360,775 B2 | | 4/2008 | Anderson et al. |
| 7,823,894 B2 | * | 11/2010 | Gerrard .................. 280/124.134 |
| 8,517,140 B2 | * | 8/2013 | West et al. ..................... 180/360 |
| 8,708,359 B2 | * | 4/2014 | Murray .................. 280/124.148 |
| 2007/0228684 A1 | | 10/2007 | Bowers |
| 2011/0221157 A1 | * | 9/2011 | Gerrard .................. 280/124.135 |
| 2011/0291379 A1 | | 12/2011 | Yanagida |

FOREIGN PATENT DOCUMENTS

| | | |
|---|---|---|
| JP | S54-153422 | 12/1979 |
| JP | S57-204907 | 12/1982 |
| JP | S58-182810 | 12/1983 |
| JP | S61-176007 | 11/1986 |
| JP | S62-061809 | 3/1987 |
| JP | S63-189808 U | 12/1988 |

OTHER PUBLICATIONS

Decision of Rejection for Japanese Patent Application No. 2011-552500, mailed Feb. 18, 2014.

Official Action for Mexican Patent Application No. MX/a/2011/009203, mailed Jun. 11, 2014.

* cited by examiner

VEHICLE SUSPENSION

CROSS-REFERENCE TO RELATED APPLICATION

This application is a Continuation application of U.S. patent application Ser. No. 13/254,286, filed Nov. 14, 2011, which is a Section 371 National Stage Application of International Application No. PCT/GB2010/000370, filed Mar. 3, 2010 and published as WO 2010/100412 A1 on Sep. 10, 2010, the content of which are hereby incorporated by reference in their entirety.

FIELD

The present invention relates to suspension for vehicles.

BACKGROUND

Vehicles need a suspension system in order to keep the wheels in contact with the surface over which the vehicle is being driven, and to insulate the vehicle body from at least some of the undulations in that surface. The former requirement is necessary in order to ensure the safe and effective handling of the vehicle, and the latter is necessary in order to provide the necessary level of ride comfort. Generally, these two requirements act in opposite directions, and a suspension system is therefore a compromise between the two. A range of suspension systems are known.

The MacPherson strut suspension, often used for the front suspension, comprises a wishbone or a substantial compression link stabilized by a secondary link, which provides a bottom mounting point for a wheel hub or axle. This lower arm system provides both lateral and longitudinal location of the wheel. The upper part of the hub is rigidly fixed to the inner part of a sprung and damped strut, which extends upwards directly to a mounting in the body shell of the vehicle.

Double wishbone suspension locates the wheel through the use of two (upper and lower) arms, each in the shape of an "A" or a wishbone. Each arm has two mounting points on the chassis and one joint at the knuckle. A shock absorber and coil spring are mounted to the wishbones to control vertical movement. Double wishbone designs allow the engineer to carefully control the motion of the wheel throughout suspension travel, controlling such parameters as camber angle, caster angle, toe pattern, roll center height, scrub radius, scuff and more.

A multi-link suspension uses three or more lateral arms, together with one or more longitudinal arms, to define and constrain the movement of the wheel hub. These arms do not have to be of equal length, and may be angled away from their 'obvious' direction. Typically each arm has a spherical joint (ball joint) or rubber bushing at each end, and therefore react loads along their own length, in tension and compression, but not in bending. Some multi-links also use a trailing arm or wishbone, which has two bushings at one end.

All have relative advantages and disadvantages, typically reflecting a variation in the level of ride comfort or handling that is achievable against the cost and complexity of the system.

SUMMARY

The present invention seeks to provide a suspension system for a vehicle that offers levels of ride comfort and/or handling that meet or exceed the demanding standards that are now set, but through the use of a significantly lower parts count.

Such a reduction in parts count offers great advantages in use. The immediate advantage lies, of course, in the cost of the system in that if fewer parts need to be made and assembled, then the resulting cost of the assembly is directly reduced. However, other advantages also flow from a reduced parts count, in that the levels of parts stocking that is required of assemblers and dealers is reduced, the material usage is reduced, the weight of the system and of the vehicle is reduced, and so on. As well as reducing the build cost of the vehicle, these factors contribute directly to a reduction in the running costs of the vehicle in terms of its fuel consumption, servicing costs, and environmental impact.

The present invention therefore provides a vehicle suspension, comprising an assembly of a hub carrier and a support arm, the support arm being attached to the hub carrier at two points spaced from each other in the direction of travel and extending inwardly therefrom to a support arm attachment point for fixing to a chassis, and a trailing link extending from the assembly in a direction transverse to that of the support arm, toward a trailing link attachment point for fixing to the chassis.

The trailing link preferably extends from the assembly in a forward direction, thereby placing it under tension, reducing the likelihood of it buckling, and hence allowing for a more slender item that has less weight and uses less material in its production. It is preferably connected directly to the hub carrier.

A strut can be provided, extending upwardly toward an attachment point for fixing to a chassis, to provide the necessary vertical positioning of the suspension, together with (preferably) the usual spring and damper.

The support arm can comprise a pair of arms extending divergently from the attachment point to each of the two points. This is, in effect, a wishbone form, but mounted in an orientation that is the opposite of the usual orientation.

The hub carrier can include a pivot pin extending in a fore/aft alignment, passing through two pivot points on the support arm thereby to define the two points. The appropriate end of the pivot pin provides a convenient location for attaching the trailing link to the hub carrier.

The hub carrier preferably carries an axle, which can be driven via a drive shaft extending from an engine or from a suitable differential or other gearbox. A wheel can be fitted to the axle.

The invention further relates to a vehicle, comprising a chassis and at least two wheels, one on each side of the vehicle, each wheel being attached to the chassis via a suspension as defined above.

In this application, directions or orientations referred to are intended to be interpreted relative to the vehicle on which the suspension is, or is intended to be, mounted. Thus, a "forward" or "fore" direction means one towards the front of the vehicle, and a "rearwards" or "aft" direction is to be interpreted likewise. Similarly, a direction such as "inward" means one that is towards the centreline of the vehicle, "outwards" meaning the opposite. It is not intended that strict geometric alignment be inferred (unless indicated otherwise); thus a "forward" direction is not necessarily limited to one that is precisely aligned with the vehicle's direction of travel, but indicates a forward direction as opposed to a rearward or an inward direction.

BRIEF DESCRIPTION OF THE DRAWINGS

An embodiment of the present invention will now be described by way of example, with reference to the accompanying figures in which.

DETAILED DESCRIPTION OF THE EMBODIMENTS

A modern lightweight and efficient ultra-compact city car requires an independent, lightweight rear suspension with excellent camber and toe control. For packaging reasons we also need the suspension to allow the installation of a rear transverse mounted engine and transmission unit in the close proximity. Normal practice is to use either trailing arm, semi trailing arm, De-Dion or Semi-De-Dion type suspensions. These are however very heavy, expensive, and provide very poor control of camber and toe control at the tyre contact patch. In many instances, they provide no independence from side to side. We sought to design a system that provides all the advantages of a conventional McPherson strut system with the added advantage of much more effectively decoupling the transverse compliance from the longitudinal compliance.

Figure 1:
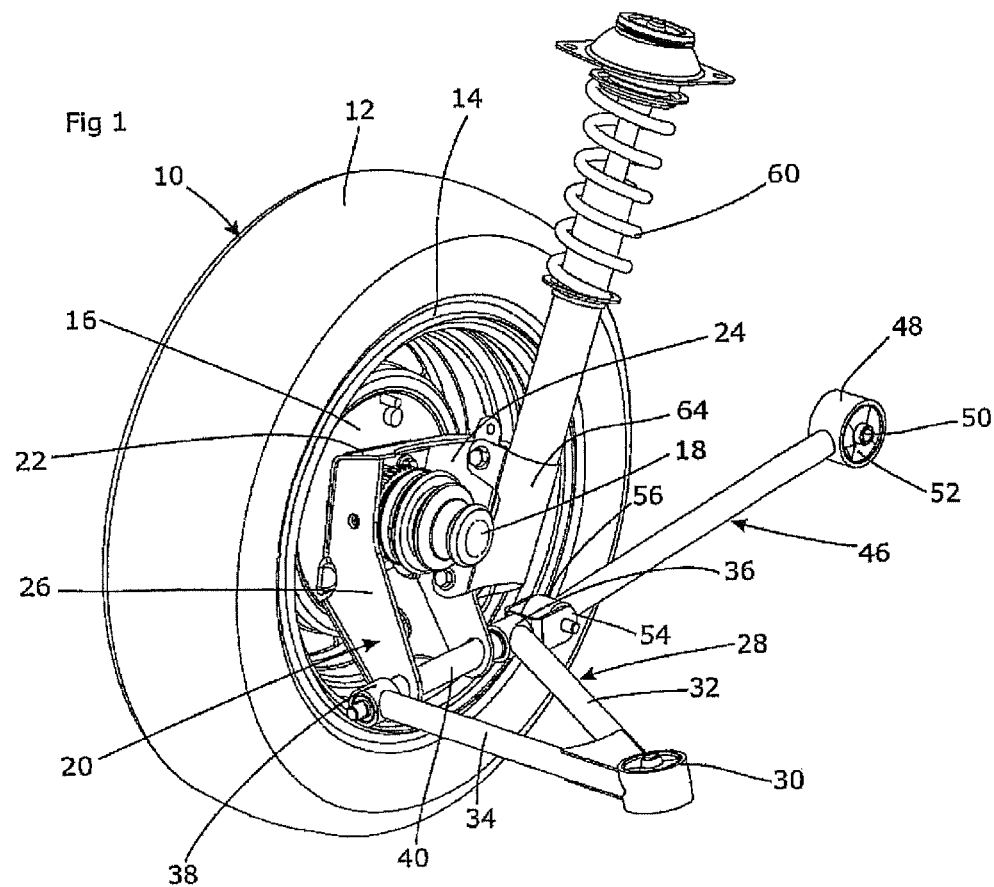
FIG. 1 shows a perspective view of the suspension system.

FIG. 1 shows an embodiment of the present invention, shown in the form of a wheel and the associated suspension separate from the vehicle chassis to which it would, in use, be attached.

Thus, a wheel 10 comprising a tyre 12 fitted onto a rim 14 is bolted to a wheel hub 16. This is attached to an axle 18 and the assembly is rotateably supported on a hub carrier 20. A drive shaft 21 (not shown) leads from a differential to the axle 18 in order to transmit drive torque to the wheel 10 and propel the vehicle.

The hub carrier 20 comprises a mount for the axle 18 and hub 16 comprising suitable bearings (not visible) to allow rotation thereof, and a set of stiffening flanges extending inwardly therefrom to provide rigidity to the hub carrier 20 and mounting points for the suspension elements. An upper flange 22 extends from an upper edge of the hub carrier 20, together with two side flanges in the form of a fore side flange 24 and an aft side flange 26. To these flanges are connected the principal suspension components, as follows.

First, an inverted wishbone 28 provides lateral compliance to the system. This is inverted in that, contrary to usual practice, there is a single attachment point 30 at the chassis, from which two wishbone arms 32, 34 extend to (respectively) a fore attachment point 36 and an aft attachment point 38 on the respective side flanges 24, 26 of the hub carrier 20. These fore and aft attachment points are in the form of a rod 40, which passes through apertures in the side flanges 24, 26, and through corresponding cylindrical sections at the ends of the wishbone arms 32, 34. Thus, the wishbone arms 32, 34 are anchored onto the rod 40, allowing the necessary relative rotation as the wheel rises and falls.

A similar cylindrical section is included in the chassis attachment point 30, oriented vertically so as to allow for some fore/aft adjustability. This is mounted onto a suitable stud 42 (not shown in FIG. 1) or the like on the chassis, via a rubber bushing 44 to allow limited movement of the wishbone arm 28 in all directions.

A trailing link 46 is also provided in order to offer fore and aft compliance. This is connected to the chassis by a horizontally-aligned cylindrical link 48 mounted on a similar stud 50 via a rubber bushing 52. This allows easy rotation of the trailing link 46 in a vertical plane as the wheel 10 rises and falls, and also allows some movement in other directions to accommodate the suspension geometry.

At its other end, the trailing link 46 is attached to the fore end of the rod 40. A U-section bracket 54 attached to the end of the rod 40 encloses a somewhat smaller cylindrical section 56 on the end of the trailing arm 46. A pin 58 passes horizontally through the U-section 54 and through a rubber bushing within the cylindrical section 56, so that the trailing arm 46 restrains the wheel 10 in the fore and aft directions but allows upward and downward motion.

The third and final principal suspension element is a strut 60. This is a conventional spring and damper unit, attached to the chassis via a top mount 62 (not shown in FIG. 1) and to the hub carrier 20 via a bracket 64 that is clamped to the lower end of the strut 60 and bolted in two places to the fore side flange 24. The strut thus keeps the hub carrier in a generally upright alignment and provides a downward force to the wheel 10 to keep it in contact with the ground, and damping of the upward and downward movement of the wheel 10.

Figure 2:
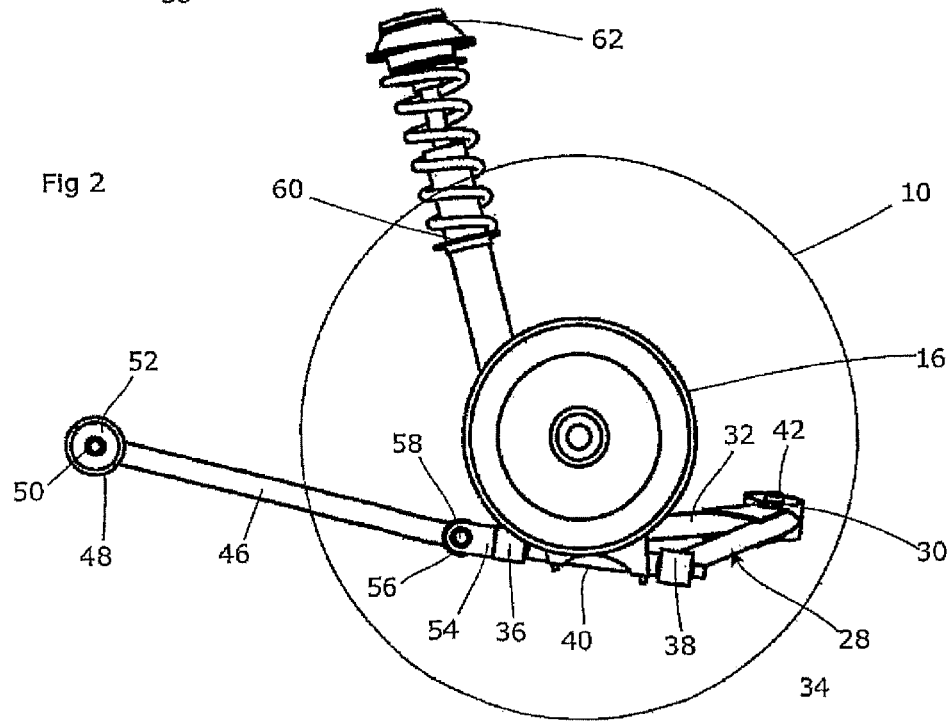
FIG. 2 shows a view of the suspension system from one side.

FIG. 2 shows the system from one side. The wheel 10 is shown schematically, mounted on the hub 16. The inverted wishbone 28 is shown, attached to the rod 40 which can be seen to be angled upwardly toward the front of the vehicle. Likewise, the trailing arm 46 angles downwardly from its chassis mount 50 to the U-section bracket 54 on the rod 40. The strut is angled slightly forward, the top mount 62 being somewhat forward of the bracket 64. These angles and orientations can be adjusted in design of the suspension system in order to provide the desired handling properties.

Figure 3:
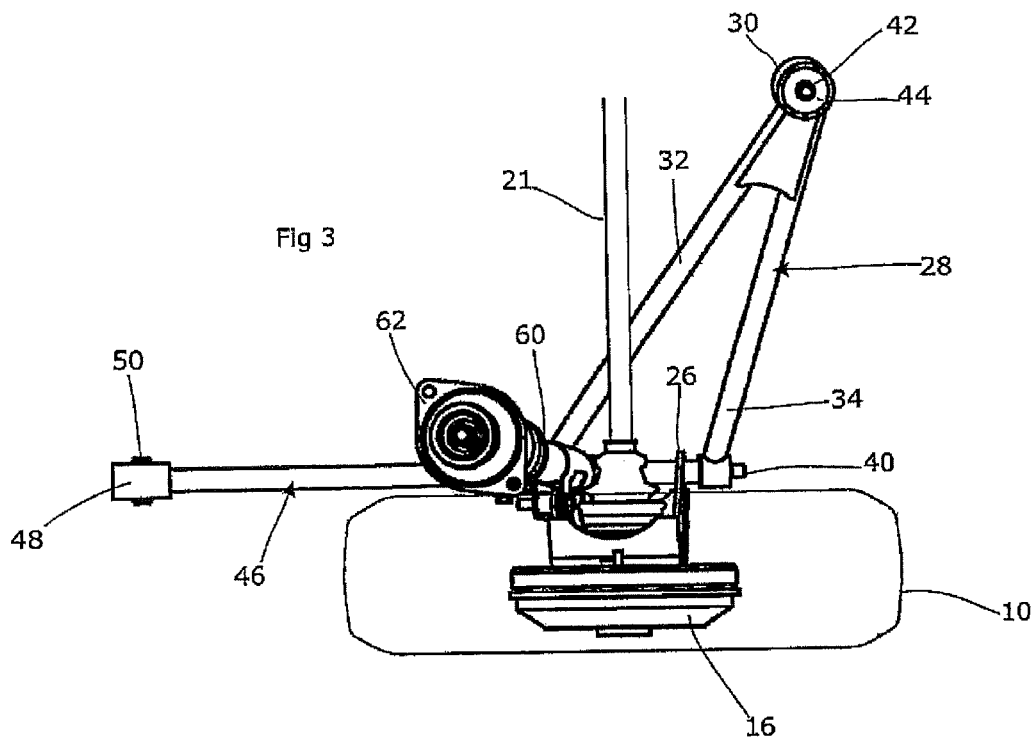
FIG. 3 shows a view of the suspension system from above.

FIG. 3 shows the system from above, illustrating the angle of the inverted wishbone 28. The aft wishbone arm 34 is shorter than the fore arm 32, meaning that the attachment point 30 to the chassis is aft of the wheel centreline. This allows space for the drive shaft 21 to reach the wheel hub 16, passing fore of the attachment point 30 and above the fore wishbone arm 32.

Figure 4:
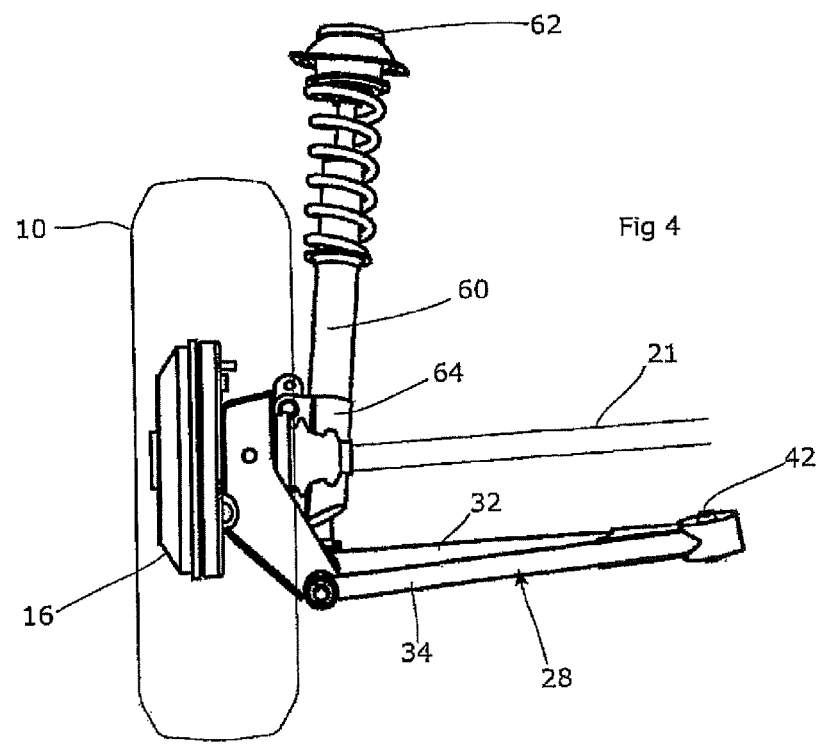
FIG. 4 shows a view of the suspension system from the rear.

FIG. 4 shows the system from the rear, with the drive shaft 21 passing above the inverted wishbone 28.

Figure 5:
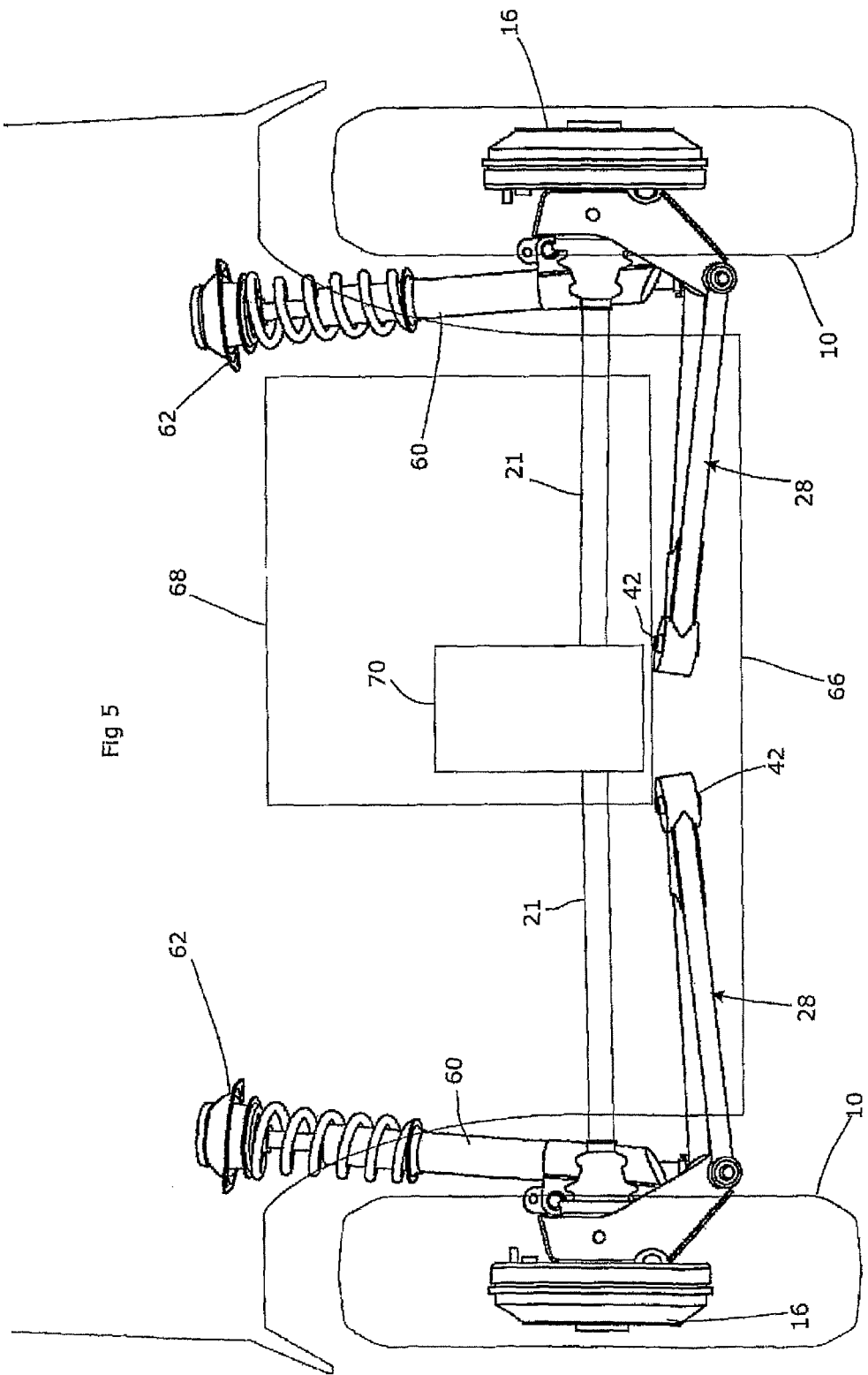
FIG. 5 shows a view of the rear part of a vehicle fitted with the suspension system of the present invention.

FIG. 5 shows a schematic view from the rear of a compact town car with the above-described suspension system installed. The chassis 66 provides the necessary mounting points 42, and houses an engine 68 and gearbox 70. A pair of drive shafts 21 project outwardly in both directions from the gearbox 70 and towards wheel hubs 16 on either side of the vehicle. One wheel 10 is mounted on each wheel hub 16, and each wheel is supported by a suspension system as described above, including an inverted wishbone 28, a strut 60, and a trailing arm (not visible in FIG. 5).

As is evident from FIG. 5, the illustrated system is designed to meet the needs of the rear wheels of a rear-engined, rear wheel drive configuration. It could however be applied in other configurations, such as the driven or non-drive wheels of front-wheel drive (or other) layouts.

This 'inverted wishbone' system not only delivers the ride and handling advantages of an independent suspension system, but is also designed with a two part linkage (the inverted wishbone 28 plus the trailing link 46) to allow separation of fore and aft compliance for ride and comfort and lateral compliance for the vehicle handling control (camber and toe control). Together with the strut 60, the overall system is extremely lightweight and has a low production cost as it comprises only two links per vehicle side and only three compliant elements per vehicle side.

The described system also requires only a small number of attachment points to the chassis, and allows them to be spaced well away from the drive shafts. This makes the system especially suited to a small and efficient town car in which component space is restricted and the wheels may be mounted close to the engine, gearbox etc.

It will of course be understood that many variations may be made to the above-described embodiment without departing from the scope of the present invention.

Although the present invention has been described with reference to preferred embodiments, workers skilled in the art will recognize that changes may be made in form and detail without departing from the spirit and scope of the invention.

What is claimed is:

1. A vehicle suspension, comprising an assembly of:
   a hub carrier
   a support arm attached to the hub carrier at two points spaced from each other in the direction of travel and extending inwardly therefrom to a single support arm attachment point for fixing to a chassis, the support arm attachment point comprising a cylindrical section mounted on a vertically-oriented stud via a rubber bushing to allow limited movement of the support arm relative to the chassis in all directions;
   a trailing link extending from the hub carrier in a forward direction transverse to that of the support arm, toward a trailing link attachment point for fixing to the chassis, the trailing link attachment point comprising a cylindrical link mounted on a horizontally-oriented stud via a rubber bushing; and
   a strut extending upwardly from the hub carrier toward a top mount for fixing to a chassis, the strut providing a spring and a shock absorber.

2. A vehicle suspension according to claim 1 in which the support arm comprises a pair of arms extending divergently from the attachment point to each of the two points.

3. A vehicle suspension according to claim 1 in which the hub carrier includes a pivot pin extending in a fore/aft alignment, and which passes through two pivot points on the support arm thereby to define the two points.

4. A vehicle suspension according to claim 3 in which the trailing link is connected to an end of the pivot pin.

5. A vehicle suspension according to claim 1 in which the trailing link is connected to hub carrier.

6. A vehicle suspension according to claim 1 further comprising an axle carried by the hub carrier.

7. A vehicle suspension according to claim 6 in which the axle is a driven axle.

8. A vehicle suspension according claim 7 further comprising a wheel fitted to the axle.

9. A vehicle comprising a chassis and at least two wheels, one on each side of the vehicle, each wheel being attached to the chassis via a suspension according to claim 6.

* * * * *